United States Patent [19]

Hansen

[11] Patent Number: 4,833,353

[45] Date of Patent: May 23, 1989

[54] METHOD OF OPTIMIZING ARMATURE BALANCE THROUGH LAMINATION ORIENTATION

[75] Inventor: Kent G. Hansen, London, Canada

[73] Assignee: Ram Air Manufacturing, London, Canada

[21] Appl. No.: 118,038

[22] Filed: Nov. 9, 1987

[51] Int. Cl.$^4$ .................. H02K 1/26; H02K 15/16
[52] U.S. Cl. ..................................... 310/51; 310/261; 310/216
[58] Field of Search ............... 310/51, 216, 217, 218, 310/261, 42

[56] References Cited

U.S. PATENT DOCUMENTS 3,417,272 12/1968 Hoy ...................................... 310/261
3,477,125 11/1969 Schwartz ............................. 310/216

FOREIGN PATENT DOCUMENTS 55-41168 3/1980 Japan .................................... 310/216

Primary Examiner—Patrick R. Salce
Assistant Examiner—D. L. Rebsch
Attorney, Agent, or Firm—Cushman, Darby & Cushman

[57] ABSTRACT

An electrical flux conducting rotor is formed with a stack of sheet metal blanks laminated together, with the blanks extending perpendicular to the axis of rotation. The blanks have similar outline shapes disposed in alignment in the stack. The outline shape of each blank has a symmetry such that any blank in the stack is capable of being stacked in outline alignment with any other blank when displaced in such stacked relation angularly about the axis of rotation of said rotor a plurality of equal angular divisions of 360°. Each blank has a predetermined orientation based upon being similarly blanked from the same metal sheet. The blanks of the stack are arranged preferably in one group which contains four successive blank sections, each blank section containing an equal number of blanks. The blanks of the outer two blank sections are displaced angularly 180° with respect to the predetermined orientation relative to the inner two blank sections, so as to statically and dynamically balance the orientation of the blanks of the blank sections about the axis of rotation of the rotor.

12 Claims, 2 Drawing Sheets

METHOD OF OPTIMIZING ARMATURE BALANCE THROUGH LAMINATION ORIENTATION

This invention relates to electrical devices and more particularly to electrical devices of the type embodying an electrical flux conducting rotor, as, for example, a DC motor having an armature.

In the conventional construction of the flux conducting rotor of an electrical device, the windings which create the flux are made about a laminated core which is suitably fixed to the shaft. The laminated core is formed from a multiplicity of flat blanks which are stamped from a sheet of metal (e.g. steel).

It is highly desirable in constructing the rotors that they be dynamically and statically balanced, since any static or dynamic imbalance may introduce vibrations during operation which can be the cause of a short bearing life. Where electrical devices are made in large numbers as, for example, for automotive use, very expensive balancing equipment is used to test each finished rotary assembly for dynamic and static balance and to correct the imbalance where necessary by either adding a putty or removing metal from an appropriate place or places on the rotor. The extent to which there is imbalance in the assembled rotors determines the throughput time of the equipment and hence the costs involved. It is therefore important that the assembling practices be such as to maximize the percentage of the assembled rotors which meet the required balancing tolerances and do not require subsequent material removal or addition to bring them into the desired balancing tolerance. Conversely, it is important to minimize the amount of correction that must be accomplished. If, in order to meet these balancing requirements, the sheet metal which is utilized to stamp the blanks must be held within very small tolerances, the material costs can become prohibitive. It is desirable therefore in producing armatures and other rotating electrical flux conducting assemblies to be able to utilize the sheet metal within a fairly wide range of tolerances, which reduces material costs. On the other hand, where considerable variation in the dimension of the sheet material which forms the blanks is tolerated, there exists a greater danger that when the blanks are finally assembled in a stacked relation, the effect of the lack of close tolerance will be multiplied to the extent that the final assembly cannot be controllably made within the final tolerance. Even if a close tolerance in the uniformity of the sheet steel used to stamp out the blanks is maintained, there is still no assurance that the center hole of the blanks will be always exactly on a true dimension.

To attempt to minimize the imbalance resulting from these variables, it is common practice in assembling the stack of blanks, for the assembler to divide the stack received from the blank manufacturer in half and to rotate one half 180° with respect to the other. It was felt that this procedure had the effect of averaging out the dimensional imbalances that inevitably were presented. While these procedures have helped the situation, there still exists a need to provide procedures which will result in the production of a greater percentage of rotors coming within the final desired tolerance even though wide tolerance sheet metal is utilized to make the blanks which are stacked to form the assembly.

It is an object of the present invention to provide an improved method of making an electrical flux conducting rotor which further minimizes rotor imbalance and hence fulfills the above described need. In accordance with the principles of the present invention, this objective is achieved by providing a method which includes the steps set forth below. The first step is to utilize as blanks to form the rotor stack, one group or a plurality of groups of blanks, each of which has a predetermined orientation based upon being similarly blanked from the same metal sheet. The next step is to arrange the blanks of each group in a plurality of successive blank sections numbering at least four, while insuring that each blank section contains a number of blanks equal to the number of blanks in each blank section of the associated group. Finally, the blanks of the blank sections of each group are displaced angularly with respect to the predetermined orientation relative to one another so as to statically and dynamically balance the orientation of the blanks of the blank sections of each group about the axis of rotation of the rotor. Once the blank stack is oriented in the manner noted above, the stack of blanks is then laminated together. Preferably, the blanks utilized to form the stack are in one group in which, prior to the arranging step, the predetermined orientation of the blanks are commonly oriented. Moreover, the commonly oriented blanks of the single group are preferably divided into four blank sections which are relatively angularly displaced to achieve static and dynamic balancing by moving the middle two blank sections 180° with respect to the outer two blank sections.

In accordance with the principles of the present invention additional minimization of imbalance can be secured by inverting half of the blanks of the stack with respect to the other half of the blanks of the stack to further statically and dynamically balance the orientation of the blanks of the blank sections of each group without materially altering the static and dynamic balance achieved by the aforesaid irregular displacement.

the preferred method involving one group and four ctions, the first two sections are inverted with respect the last two sections.

A further object of the present invention is the provision of an improved electrical flux conducting rotor in which the blanks forming the core lamination are oriented in accordance with the method principles enunciated above.

These and other objects of the present invention will become more apparent during the course of the following detailed description and appended claims.

The invention may best be understood with reference to the accompanying drawings wherein an illustrative embodiment is shown.

IN THE DRAWINGS

Figure 1:
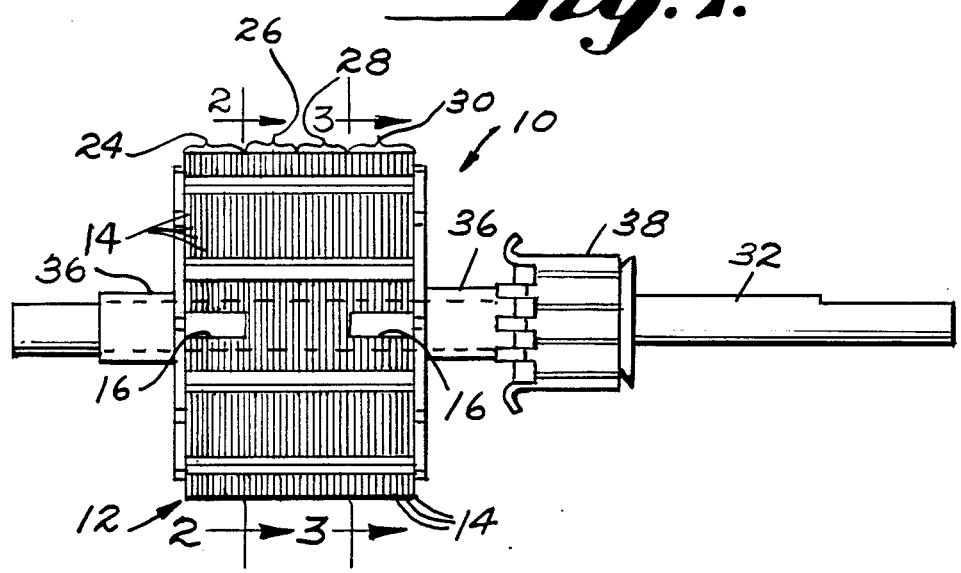
FIG. 1 is a front elevational view of an electrical flux conducting rotor constructed in accordance with the principles of the present invention.

Referring now more particularly to the drawings, there is shown in FIG. 1 an electrical flux conducting rotor or armature, generally indicated at 10, which is constructed in accordance with the principles of the present invention. As shown, the rotor 10 includes a core lamination 12 which is in the form of a stack of individual blanks 14. Each of the blanks 14 is stamped from essentially the same sheet of sheet metal, preferably steel, from a single stamping die assembly. The blanks 14 are oriented in relation to the position in which they are stamped from the die assembly. In order to insure that the die formation orientation of each blank is known, preferably, each blank is formed with an indicia 16. The indicia is illustrated in the drawings in greatly exaggerated size for purposes of visually demonstrating the principles of the present invention. The indicia in actual practice may be as small as a simple scratch on the periphery of the blank. As shown, each blank 14 is in the form of a circular disk having a series of equally angularly spaced notches 18 formed in the outer marginal periphery thereof. In accordance with the conventional procedures, the notches 18 are adapted to receive windings when the core lamination is finally assembled. Each pair of adjacent notches 18 defines an essentially T-shaped core portion 20 so that there is provided a series of T-shaped portions in the marginal periphery of the blank. As shown there are ten T-shaped portions 20 thus defining an outline shape of each blank which has a symmetry such that any blank in the stack is capable of being stacked in outline alignment with any other blank when displaced in such stacked relation angularly about the axis of rotation of the rotor a plurality of equal angular divisions of 360°. In the embodiment shown wherein ten T-shaped portions 20 are provided, each blank 14 is capable of being stacked in outline alignment when displaced angularly about the axis of rotation an angle of 36°. The axis of rotation of the rotor 10 is coincident with the center of the circular outer periphery of each blank 14 and each blank is also formed with a center hole 22 extending therethrough which likewise is concentric with the axis of rotation.

The present invention is concerned with the manner in which the blanks 14 which are stacked to form the core lamination 12 are oriented to minimize both static and dynamic imbalance in the finally assembled rotor 10. It is usual practice for rotor assemblers to obtain blanks from the blank manufacturer in stacked formation. Applicant has found that unless efforts are made to insure that the stack of blanks coming from the blank manufacturer are in fact all commonly oriented with respect to their orientation from the stamping die, the usual situation will be one in which there may well be some non-uniformity in the orientation of the stack received from the blank manufacturer. The provision of the indicia 16 on the blank 14 provides the rotor assembler with a means of checking the blank manufacturer in this regard and of inducing the blank manufacturer to maintain such uniformity in actual practice. It may well be that the non-uniformity in the orientation noted above has been a contributing factor in the degree to which imbalance in the final assembly occurred heretofore.

As previously noted, prior practice was one in which the rotor assembler simply accepted the stack of blanks which was received from the blank manufacturer, divided them in half and rotated one half 180° with respect to the other half. By practicing the principles of the present invention with respect to the final orientation of the blanks in the stack, a minimization of imbalance is obtained. In accordance with the principles of the present invention, the blanks 14 which are to form the stack to make up the core lamination 12 are received in a commonly oriented condition with respect to their manufacturing orientation. The blanks 14 which are to be utilized are divided initially into one or more groups. Preferably a single group is utilized containing a number of blanks 14 which is equal to the final number which is to form the core lamination 12. This group is then essentially divided into at least four sections. In the embodiment shown there are only four such sections and they are designated by the reference numerals 24, 26, 28 and 30. Each section contains a number of blanks equal to the number of blanks in each of the blank sections of the single group. In the embodiment shown, the group consists of forty-eight blanks 14 and consequently each blank section consists of twelve blanks 14. The blanks 14 of the blank sections 24, 26, 28 and 30 of the single group are then displaced angularly with respect to the predetermined orientation relative to one another so as to both statically and dynamically balance the orientation of the blank sections of the group about the axis of rotation of the rotor. In the embodiment shown, the two middle blank sections 26 and 28 are displaced 180° with respect to the outer two blank sections 24 and 30, or vice versa.

Also, in accordance with the principles of the present invention, additional minimization of imbalance can be secured by inverting the blanks of the blank sections of the group with respect to the predetermined orientation relative to one another to further statically and dynamically balance the orientation of the blanks of the blank sections of the group without materially altering the static and dynamic balance achieved by the aforesaid angular displacement. In the preferred embodiment shown, wherein there is one single group and four sections, the two outer blank sections 24 and 30 are inverted with respect to the middle two blank sections 24 and 30.

Once the blanks 14 have been oriented in the orientation indicated, they are then laminated to form the core lamination 12 by compressing the same onto a central shaft 32 of the rotor 10 which is formed with four dual ridge and groove knurl configurations 34 in its periphery to fixedly grip the interior periphery of central holes 22 of the blanks 14 and retain them in their stacked laminated condition. Mounted on opposite sides of the thus formed core lamination 12 are end insulators 36. A commutator 38 is mounted adjacent one of the end insulators 36.

It will be understood that the rotor 10 in the condition of assembly shown in FIG. 1 has to be provided with appropriate windings, all in accordance with conventional procedures, for example, ten turns of 19 gauge wire. The order of winding is also in accordance with conventional procedure, it being understood that such windings are not illustrated in the rotor 10 shown in FIG. 1 but are ultimately added thereto prior to assembly within the electrical device. It will be noted that there are other items which can affect the balance of the rotor 10 such as shaft straightness, evenness of wire windings, the commutator eccentricity, and so forth. However, these are additive with respect to the core lamination imbalance, which constitutes the greatest source of imbalance.

The sheet steel from which the blanks are stamped is never perfectly consistent. That is, the thickness across the coil can vary resulting in the production of a blank 14 which has taper. There may be a notable taper at the edge of the strip which can be identified as edge taper, especially when the strip is split from near the edges of the master coil. In addition, the tooling which punches the blank will never have the center hole exactly on true dimension in center. The result of all of these various conditions is an eccentric blank, and the principles of orientation embodied in the present invention minimizes the imbalance of these eccentric parts when assembled to form the core lamination.

Figure 4:
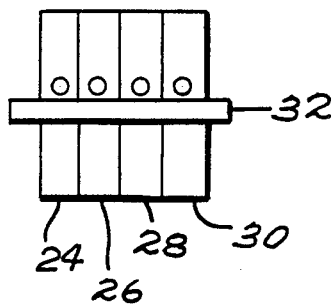
FIG. 4 is a schematic view of a stack of commonly oriented blanks illustrating the imbalance in four adjacent blank sections occasioned by central hole eccentricity and the resultant imbalance of the assembly.
Figure 5:
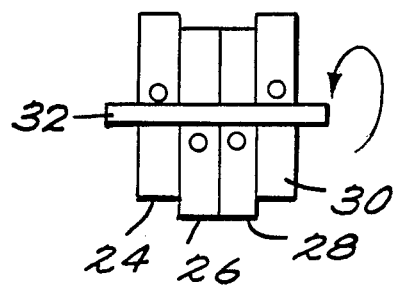
FIG. 5 is a view similar to FIG. 4 with the blank sections oriented in accordance with the principles of the present invention illustrating the static and dynamic balance of the orientation.

FIG. 4 schematically illustrates a stack of commonly oriented blanks 14 in which the eccentricity is provided by dimensional variation in the center hole. To compare the imbalance in this commonly oriented stack from the balance which is achieved in accordance with the present invention the blanks are divided into four sections 24, 26, 28 and 30 and each section is provided with a circle indicating an exaggerated weight imbalance on that side of the shaft where the eccentricity is the greatest. In FIG. 4, since all of the weight imbalance is oriented in the same direction, there is a static imbalance and a dynamic imbalance which is of more significance. It will be noted that by dividing the entire stack in half and rotating one-half 180° with respect to the other half in accordance with conventional practice a static balance is obtained since there are now two weights on each side of the shaft. However, there is no dynamic balance obtained since a couple is created between the axially offset weights. However, when the four sections are oriented in accordance with the principles of the present invention not only is static balance obtained in that there are now two circles above the shaft and two below, but dynamic balance is obtained as well, since the dynamic forces of the weight imbalances above and below the shaft act in equal and opposite directions through the middle of the stack, and thus there is achieved dynamic balance as well.

Figure 6:
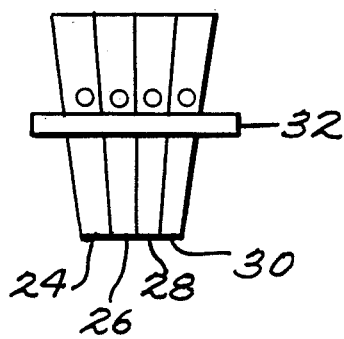
FIG. 6 is a view similar to FIG. 4 illustrating a condition of eccentricity and imbalance created by virtue of a taper in the thickness of the blanks.
Figure 7:
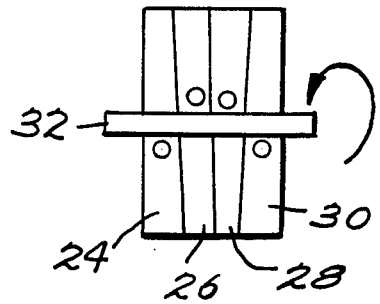
FIG. 7 is a view similar to FIG. 6 illustrating the blank sections oriented in accordance with the principles of the present invention illustrating the static and dynamic balance of the orientation.

FIG. 6 illustrates the taper eccentricity condition of a stack of blanks commonly oriented, and again circles have been provided to indicate the direction of weight offset from the axis. Here again, all four circles are on one side of the shaft presenting a static imbalance and a significant dynamic imbalance. Here again, if one-half of the stack is displaced angularly 180° with respect to the other half, static balance is achieved by bringing two circles above the shaft and two circles below. However, dynamic balance does not result from the conventional practice because there is a couple created between the two axially offset weights. FIG. 7 illustrates how the principles of the present invention bring the imbalance situation of FIG. 6 into balance. Here again it will be noted that the circles representing the eccentric weight are statically balanced on both sides of the shaft and dynamically balanced so that their force components will be acting equally and oppositely in the same location.

Figure 8:
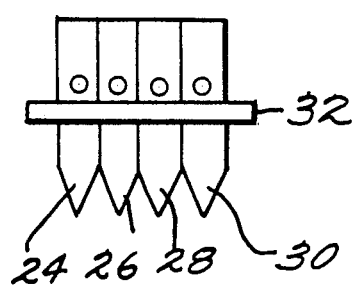
FIG. 8 is a view similar to FIG. 4 showing still another condition of eccentricity and imbalance created by virtue of edge taper in the blanks.
Figure 9:
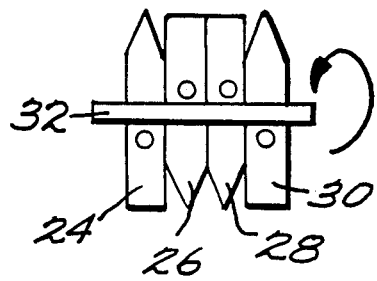
FIG. 9 is a view similar to FIG. 8 illustrating the blank sections oriented in accordance with the principles of the present invention illustrating the static and dynamic balance of the orientation.

FIG. 8 illustrates the tapered edge condition and here again the circles have been provided to show the weight eccentricity in exaggerated form. Again it will be noted that all four circles are above the shaft, thus presenting both dynamic and static imbalance. Again, it should be noted that if in accordance with conventional practice one-half of the blanks of the stack are displaced angularly 180° with respect to the other half of the blanks a static balance is brought into being but dynamic balance does not prevail because of the couple resulting from the axially offset relationship of the circles. FIG. 9 illustrates how the principles of the present invention bring the imbalance condition into balance both statically and dynamically, since now there are an equal number of circles above and below the shaft and the dynamic action n each side is in an equal and opposite direction in the same position thus presenting a dynamic balance. From the above and illustrations contained in FIGS. 4–9, it can be seen that the principles of orientation of the present invention will minimize imbalance if any one or any combination of two or even of all three situations are presented in the blanks 14 which are utilized to form the core lamination 12.

It has been found that the usual die-stamping operation results in the formation of a blank which is not always in a truly flat condition. There is a tendency for the blanks to dish at diametrically opposed ends or at one end where the cooperating dies have commenced the severing operation at slightly different times in the blanking process. Applicant has found that additional minimization of imbalance in the assembled core lamination can be secured by dividing the blank stack oriented as previously indicated in half and inverting the blank sections of one half with respect to their predetermined orientation relative to the blank sections of the other half to further statically and dynamically balance the orientation of the blanks of the blank section without materially altering the static and dynamic balance achieved by the aforesaid angular 7 displacement which is discussed above in relation to FIGS. 4–9. Preferably, as previously indicated, the inverting is accomplished by inverting either the first two sections 24 and 26 with respect to the last two sections 28 and 30 or vice versa.

Figures 2, 3:
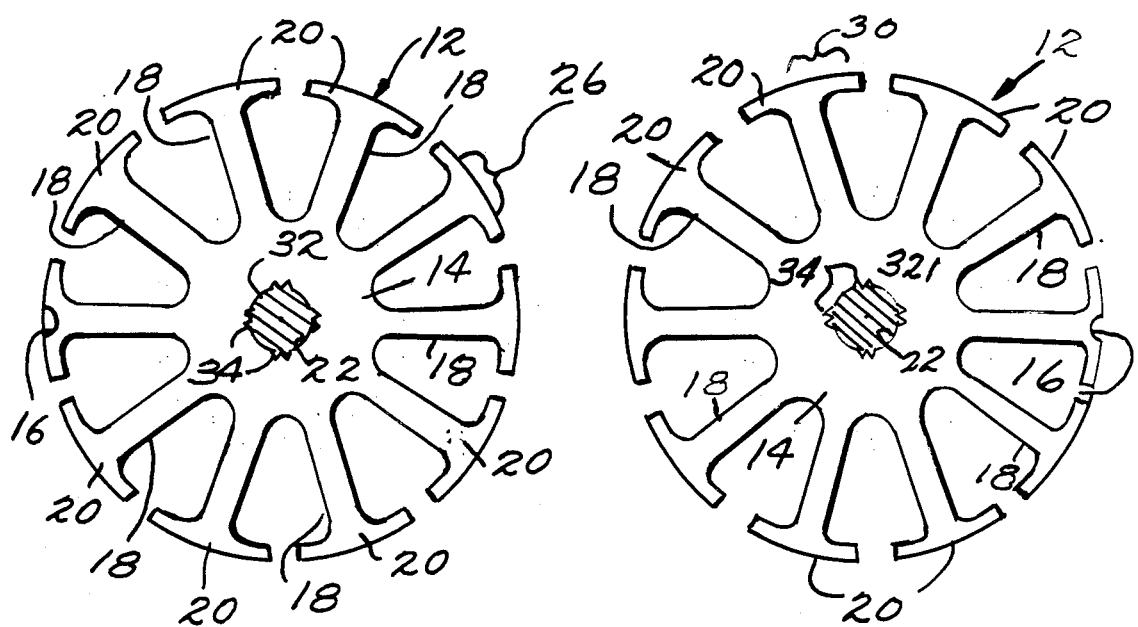
FIG. 2 is an enlarged sectional view taken along the line 2—2 of FIG. 1.
FIG. 3 is an enlarged sectional view taken along the line 3—3 of FIG. 1.

As best shown in FIGS. 1-3 of the drawings, it is preferred to accomplish the inversion by rotating or flipping one half of the blanks about an axis perpendicular to the axis (or alternatively flipping about an axis along the indicia together with a subsequent 180° rotation about the stack axis) where the indicia 16 are so as to accomplish the inversion with respect to the original predetermined orientation, while still retaining the position of the indicia in their same relative locations as shown. In addition, it is preferable to invert the one half of the stack with respect to the other which will result in a concave to concave interface rather than a convex to convex interface. Desirably, the position of the indicia can be located as to indicate the side of where the net imbalances of the type shown in FIGS. 4–9 occur although such a relationship is not essential. With respect to the dish shape or concavo-convex curvature in the surface as aforesaid, a stack containing blanks having the same predetermined orientation will have their concavo-concavity similarly oriented so that the outside surface at one end of the stack will be concave while the outside surface at the other end will be convex. When the stack is divided in half, each half will have a concave surface at the one end and a convex surface on the other end. With this orientation in mind, the preferred inversion is of the half which originally had the concave side at the one end of the stack. This concave one end during inversion ends up in abutting relation with the concave surface at the one end of other half. Thus, this inversion results in a concave-to-concave interface at the center of the stack which, when the shaft 32 is forced through the center of the stack, tend to flatten out together, thus reducing the concavo-concavity throughout the stack. A reversal inversion results in a convex-to-convex interface at the center which does not achieve the same desired flattening when placed on the shaft.

It will be understood that the static and dynamic balancing through orientation in accordance with the principles of the present invention can be secured by utilizing more than one group of blanks in the formation of the stack which makes up the final core lamination. Each group could achieve the same static and dynamic balancing as the single group. The single group is greatly preferred since it is simple and does not require duplicity of manipulative steps. It will also be understood that where blanks providing twelve T-shaped portions 20 rather than ten, as shown, are utilized it would be possible to divide the group or each group into more than four sections as for example six. It is important in order to achieve dynamic balance that the number of sections provided be a multiple of two and that they be oriented so that one-half of the total number of sections can be angularly displaced an angular amount equal to 360° divided by the number of sections in that half. Thus in the preferred four-section situation, there would be two sections in each half with the amount of displacement being 360° divided by 2 or 180° as aforesaid. In the six-section situation, there would be three sections in each half with the angular displacement between each section being 360° divided by three or 120°. A further principle to achieve dynamic balance is that the second half should be angularly displaced in an equal manner but in a mirror-image relationship with respect to the first half. Insofar as inversion is concerned, the inversion should take place with respect to an outside one half of the blank stack with respect to the other outside one half thereof.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. In an electrical device including an electrical flux conducting rotor having an axis of rotation, said rotor being formed with a stack of sheet metal blanks laminated together with the blanks extending perpendicular to said axis of rotation, said blanks having similar outline shapes disposed in alignment in the stack, the outline shape of each blank having a symmetry such that any blank in the stack is capable of being stacked in outline alignment with any other blank when displaced in such stacked relation angularly about the axis of rotation of said rotor a plurality of equal angular divisions of 360°, the improvement which comprises each blank having a predetermined orientation based upon being similarly blanked from the same metal sheet, the blanks of the stack being arranged in one group or a plurality of groups, each of which contains a plurality of successive blank sections numbering at least four, each blank section containing a number of blanks equal to the number of blanks in each blank section of the associated group, the blanks of the blank sections of each group being displaced angularly with respect to said predetermined orientation relative to one another so as to statically and dynamically balance the orientation of the blanks of the blank sections of each group about the axis of rotation of said rotor, each group having at least two blank sections in one half of the associated group and an equal number of blank sections in the other half of the associated group, the blank section of one half of each group being relatively angularly displaced in a similar manner but in a mirror image relationship to the blank sections of the other half of the associated group.

2. The improvement as defined in claim 1 wherein each blank has indicia thereon for indicating said predetermined orientation.

3. The improvement as defined in claim 2 wherein said indicia comprises a shallow notch formed in the periphery of each blank.

4. The improvement as defined in claim 2 wherein there is only one group and each blank section thereof comprises a multiplicity of blanks having the predetermined orientation thereof commonly oriented.

5. The improvement as defined in claim 4 wherein there are only four blank sections, the outer two blank sections being displaced 180° with respect to the inner two blank sections.

6. The improvement as defined in claim 5 wherein the two blank sections comprising an outer section and an adjacent inner section are also inverted with respect to said predetermined orientation with respect to the other two blank sections.

7. The improvement as defined in claim 1 wherein there is only one group and each blank section thereof comprises a multiplicity of blanks having the predetermined orientation thereof commonly oriented.

8. The improvement as defined in claim 7 wherein there are only four blank sections, the outer two blank sections being displaced 180° with respect to the inner two blank sections.

9. The improvement as defined in claim 8 wherein two blank sections comprising an outer blank section and an adjacent inner blank section are also inverted with respect to said predetermined orientation with respect to the other two blank sections.

10. The improvement as defined in claim 9 wherein the equal angular divisions of 360° comprise 36° or less.

11. The improvement as defined in claim 1 wherein the equal angular divisions of 360° comprise 36° or less.

12. The improvement as defined in claim 1 wherein a first half of the blanks of the blank stacks are inverted with respect to said predetermined orientation relative to the remaining half thereof to further statically and dynamically balance the orientation of the blanks of the blank sections of each group without materially altering the static and dynamic balance achieved by said angular displacement.

* * * * *